United States Patent [19]
Bouteille

[11] 3,875,959
[45] Apr. 8, 1975

[54] MODULAR PNEUMATIC LOGIC SYSTEM

[76] Inventor: Daniel Bouteille, rue de la Fontaine Corneille, Quincy, France

[22] Filed: Sept. 28, 1972

[21] Appl. No.: 293,164

[30] Foreign Application Priority Data
Sept. 29, 1971 France .............................. 71.35894

[52] U.S. Cl. ...... 137/119; 137/624.14; 235/201 ME
[51] Int. Cl. ............................................ G05d 16/04
[58] Field of Search ...................... 137/624.14, 119; 235/201 ME

[56] References Cited
UNITED STATES PATENTS
| | | | |
|---|---|---|---|
| 3,332,443 | 7/1967 | Mize | 137/624.14 |
| 3,543,794 | 12/1970 | Stewart | 137/624.14 |
| 3,620,127 | 11/1971 | Blaisdell | 137/624.14 |

Primary Examiner—Alan Cohan
Assistant Examiner—Gerald A. Michalsky
Attorney, Agent, or Firm—Michael S. Striker

[57] ABSTRACT

The set comprises a plurality of identical fluid flip-flop modules connectable together to form a binary chain. Each flip-flop module has a trigger inlet for receiving a fluid triggering signal upon completion of the respective preceding programmed operation, a command outlet for furnishing a fluid command signal to initiate a respective programmed operation upon receipt by said inlet of the triggering signal, and a triggering outlet for furnishing a fluid triggering signal upon completion of the respective programmed operation. The trigger inlet and trigger outlet of each module are so arranged and configurated that the flip-flop modules can be placed side-by-side to form a binary chain with the triggering outlet of each module being operatively connected with the trigger inlet of the next module in the chain.

12 Claims, 22 Drawing Figures

$S = ab + c$

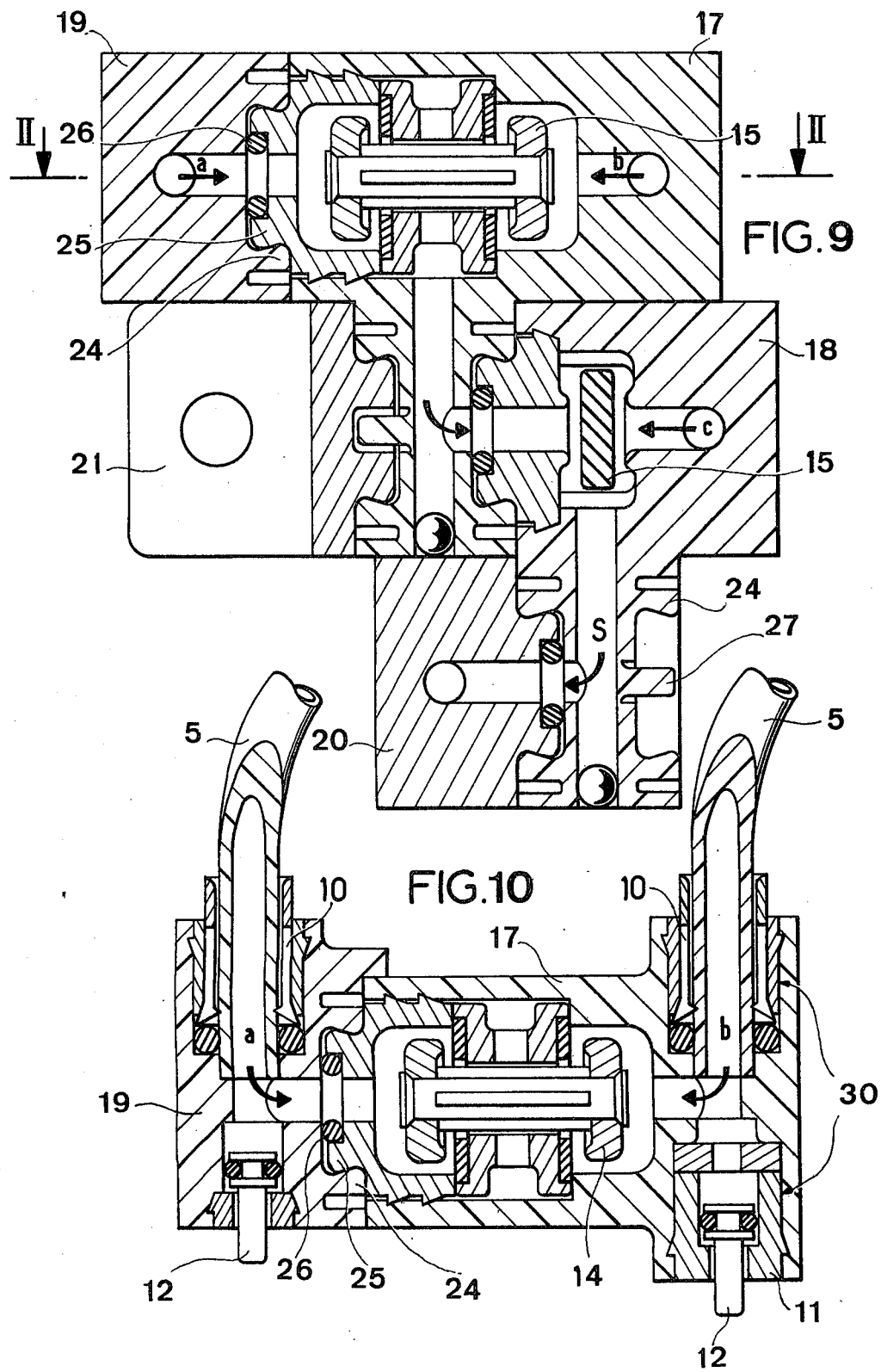

$S = ab$ $S = a+b$ $S = abcd$ $S = a+b+c+d$ $S = (a+b)cd$ $S_1 = abc$
$S_2 = (ab+c)d$ $S_1 = d(ab+c)$
$S_2 = abe+f$
$S_3 = (abe+f)g$ $S_2 = ab+cd$
$S_1 = (ab+cd)e$

FIG.20
| Séquence | 1 | 2 | 3 | 4 | 5 | 6 | 7 | 8 |
|---|---|---|---|---|---|---|---|---|
| Mouvement | 1ᵉʳ m A | B | C_D_E | A_F | | H | | J |
FIG.21
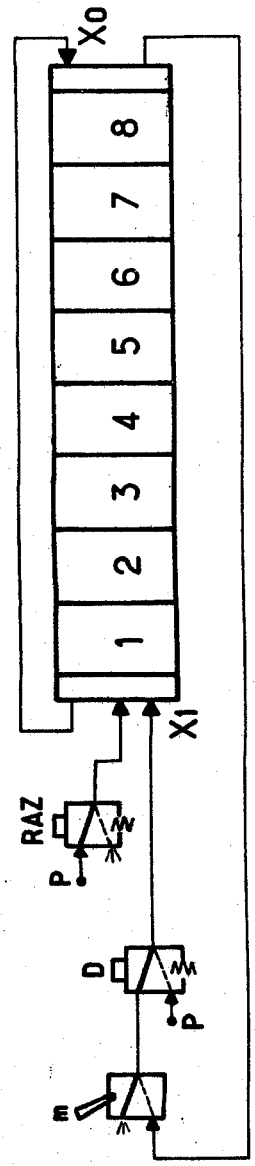
FIG.21a
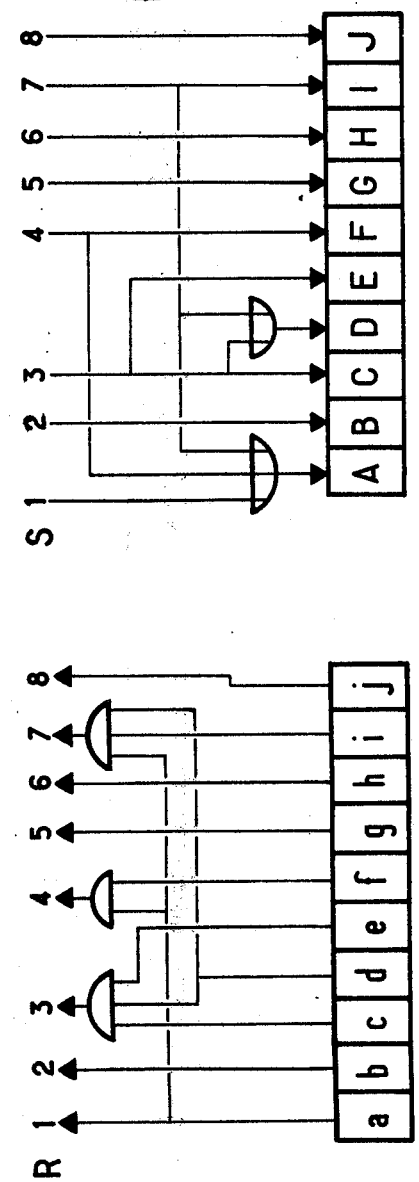

MODULAR PNEUMATIC LOGIC SYSTEM

CROSS-REFERENCES TO RELATED APPLICATIONS

The disclosure of my related application Ser. No. 281,060 entitled "Pneumatic Memory Relay" filed Aug. 16, 1972, now U.S. Pat. No. 3,818,943 and the disclosure of my related application Ser. No. 281,545 entitled "Pneumatic Memory Relay" filed Aug. 17, 1972, now U.S. Pat. No. 3,820,567 are intended to be incorporated herein by reference.

BACKGROUND OF THE INVENTION

The present invention relates to the automated control of industrial machines and operations by fluid logic means, and particularly by pneumatic logic means.

More particularly, the invention relates to fluid logic systems, particularly pneumatic systems, that can be assembled from sets of fluid-logic modules, such as fluid-logic AND-gates, OR-gates, flip-flops, etc.

Modular fluid logic systems are already known according to which a plurality of modules can be interconnected to synthesize desired logical operations and timing sequences. However, the known modular systems all suffer, to a greater or lesser extent, from a considerable degree of difficulty in the connecting together of the modules, and likewise in the disconnecting of the modules for purposes of inspection, repair or alteration of the program. Consequently, such known modular fluid logic systems are particularly unsuitable, for example, for research purposes, where it may be desired to synthesize a large number of functional alternants and equivalents, for purposes of testing and comparison.

SUMMARY OF THE INVENTION

It is accordingly the general object of the present invention to provide a modular fluid-logic system of the greatest possible flexibility, lending itself in the best possible manner to easy manipulation, i.e., assembly, disassembly and re-assembly.

It is a more particular object to provide such a modular system which is so easy to handle as to be particularly useful and convenient for purposes of logic-circuit design, research and experimentation.

It is a more specific object to provide such a modular system wherein the individual modules are connectable together in the simplest possible manner, with the least possible necessity for connecting pipes, and with the piping actually employed reduced a minimum. aminimum.

These objects, and other which will become more understandable below, can be met, according to the invention, by a set of fluid-logic modules for use in building a fluid-logic system of the type employed for the automated control of a sequence of programmed operations. The set includes a plurality of identical fluid flip-flop modules connectable together to form a binary chain. Each flip-flop module includes trigger inlet means for receiving a fluid triggering signal upon completion of the respective preceding programmed operation, command outlet means for furnishing a fluid command signal to initiate a respective programmed operation upon receipt by said inlet means of said triggering signal, and triggering outlet means for furnishing a fluid triggering signal upon completion of the respective programmed operation. The trigger inlet means and triggering outlet means of each module are so arranged and configured that the flip-flop modules can be placed side-by-side to form a binary chain with the triggering outlet means of each module being operatively connected with the trigger inlet means of the next module in the chain.

The modules according to the invention have a neat appearance and, when connected together to form, for instance, a binary chain, they form a system having an attractive and homogeneous character.

Furthermore the invention contemplates the provision of further logic-gate modules, such as AND-gate modules, OR-gate modules, NOR-gate modules, NAND-gate modules, and inverting gate modules. These can be used in conjunction with the flip-flop modules of the binary chain. For example, if each flip-flop module is to initiate a single programmed operation in a sequence of programmed operations, the additional logic-gate modules just mentioned may not be required. However, if one or more of the flip-flop modules is to initiate a plurality of simultaneous or overlapping programmed operations, such flip-flop modules may require at their fluid inlet ends the provision of additional logic-function blocks formed of the additional AND-, OR- and other gates just mentioned.

Furthermore, the modules according to the invention are so configured that they may be arranged in spatial arrangements corresponding directly to the various logical relationships between them, to facilitate design and to facilitate a ready appreciation of the programming arrangement once it has been designed.

Also, the modules according to the invention may be provided with manual override means, for departing from the predetermined programmed. For example, the flip-flop modules can be provided with manually actuatable means for triggering and resetting the flip-flop modules.

Furthermore, it is advantageous if the modules are provided with pressure-responsive means for checking the proper operation of the respective modules and/or for providing a visual indication of whether each flip-flop module, for example, is in triggered or reset condition, at any given moment.

The novel features which are considered as characteristic for the invention are set forth in particular in the appended claims. The invention itself, however both as to its construction and its method of operation, together with additional objects and advantages thereof, will be best understood from the following description of specific embodiments when read in connection with the accompanying drawing.

BRIEF DESCRIPTION OF THE DRAWING

FIG. 7b is a side view of the function block of FIG. 7a;

FIG. 9 is a vertical section through the function block of FIG. 8;

FIG. 10 is a horizontal section through the function block of FIG. 8;

FIG. 20 indicates in tabular form a sequence of programmed operations to be automatically controlled by a binary chain according to the invention supplemented by logic-gate modules according to the invention;

FIG. 21 is a very schematic diagram of the binary chain employed to control the sequence of operations set forth in FIG. 20;

FIG. 21a is a schematic diagram of the logic circuitry required to supplement the basic binary chain, for implementing the control of the desired sequence of operations;

DESCRIPTION OF THE PREFERRED EMBODIMENTS

Figure 1:
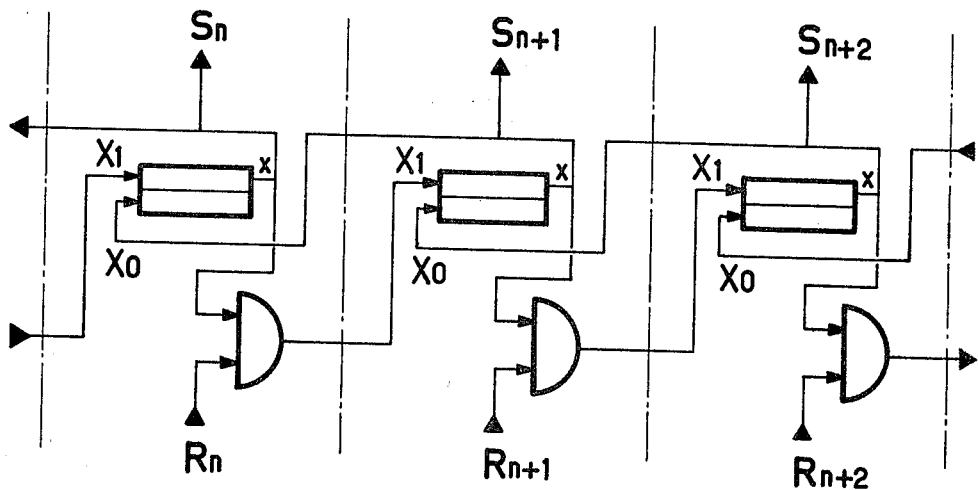
FIG. 1 is a logic diagram of a form of a binary chain employed in the arrangement of the fluid logic modules according to the invention.

FIG. 1 illustrates the logic diagram of a conventional binary chain of a type already known in electronic logic circuitry. Each stage of the binary chain includes a pneumatic flip-flop having a trigger inlet $X_1$, a reset inlet $X_0$, and command outlet means including a flip-flop outlet $x$. The basic flip-flop module employed also includes a return inlet $R_n$ for receipt of a signal indicating the completion of the programmed operation controlled by the respective module, and a pneumatic AND-gate. Furthermore, each flip-flop module has a command outlet $S_n$ for furnishing to a controlled machine a pneumatic command signal to initiate the programmed operation associated with the respective stage of the binary chain.

The operation of the binary chain of FIG. 1 is as follows:

A triggering signal is applied to trigger inlet $X_1$ of flip-flop module $n$. This indicates that the preceding operation in the sequence of operations has been completed. This fluid triggering signal triggers flip-flop n and produces at command outlet $S_n$ a fluid command pulse furnished to a non-illustrated machine, instructing the machine to perform the programmed operation associated with stage $n$ of the binary chain. At the same time, a fluid output signal is furnished by flip-flop output $x$ to one inlet of the pneumatic AND-gate. When the programmed operation associated with stage $n$ of the binary chain has been completed, the non-illustrated machine performing that operation applies a fluid feedback signal to inlet $R_n$ of the AND-gate. Now, the pneumatic AND-gate will have an input signal at both its inlets, and will accordingly furnish at its outlet a triggering signal to the trigger inlet $X_1$ of the next stage n+1. The sequence of operations just described is then repeated, for each subsequent stage of the chain. The chain will ordinarily have a beginning and an end, and accordingly the triggering signal for the first flip-flop module for example be manually or otherwise initiated, and the triggering signal furnished by the last stage will not trigger any further stage, but instead may for example energize a signalling means to indicate that the sequence of operations has been completed. Of course, the ends of the binary chain could be connected together to form a pneumatic ring counter, if that were desired for the control of cyclical sequences of operations.

The physical construction of the flip-flop modules forming the binary chain is explained in detail below. It is noted now, however, that a principal feature of the invention lies in the fact that the modules are so configurated, and the inlets and outlets of each module so disposed, that the modules can be operatively connected simply by placing them in side-by-side relationship, with all the necessary pneumatic connections between the successive modules being effected directly upon such juxtaposition.

Figure 2:
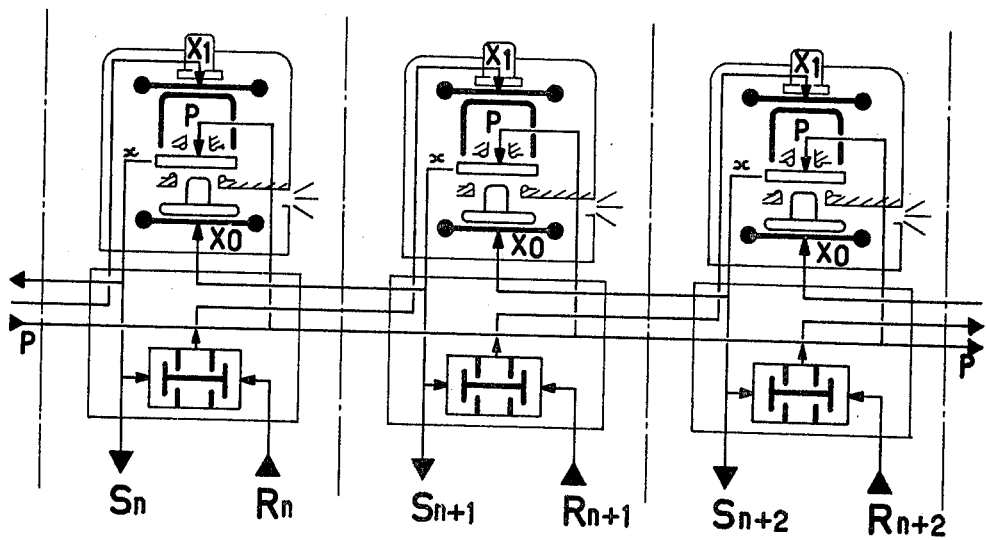
FIG. 2 is a pneumatic logic diagram exactly analogous to the logic diagram of FIG. 1, but indicating schematically the presence of pneumatic logic means and the flow of pneumatic signals.

FIG. 2 is a pneumatic logic circuit exactly corresponding to the logic circuit of FIG. 1, but showing schematically the flip-flops and AND-gate in pneumatic form, and also showing schematically the channel P for the principal pneumatic flow to all the flip-flops, this principal flow being necessary in addition to the pneumatic input signals in order to make the flip-flops operative.

Figure 3:
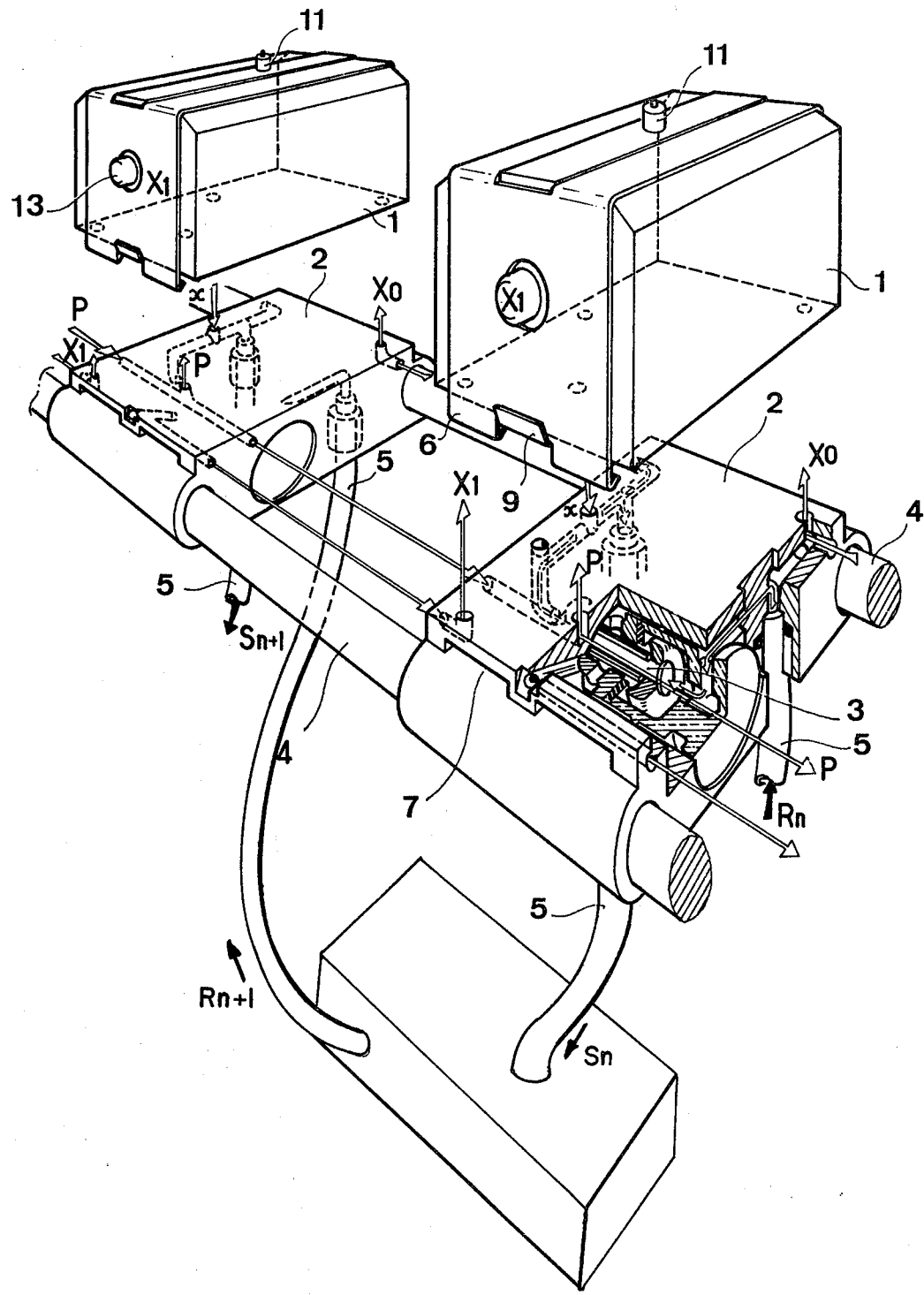
FIG. 3 is a perspective view of the physical appearance of two flip-flop modules according to the invention, showing how each module is actually composed of two separable sub-modules.

FIG. 3 is a perspective exploded view showing the physical appearance of two exemplary flip-flop modules according to the invention. Each flip-flop module is comprised of a first sub-module 1 and a lower second sub-module 2. The upper sub-module 1 is here shown to the extent of its emptied outer casing, the actual pneumatic flip-flop unit being removed, for purposes of simplicity. The illustrated casing for the upper sub-module 1 has at its bottom side four openings, designated $X_1$, $X_0$, x and P. These openings are provided for the passage therethrough of input and output fluid signals, and for the passage of the primary fluid flow, as explained with reference to FIGS. 1 and 2.

Figure 4:
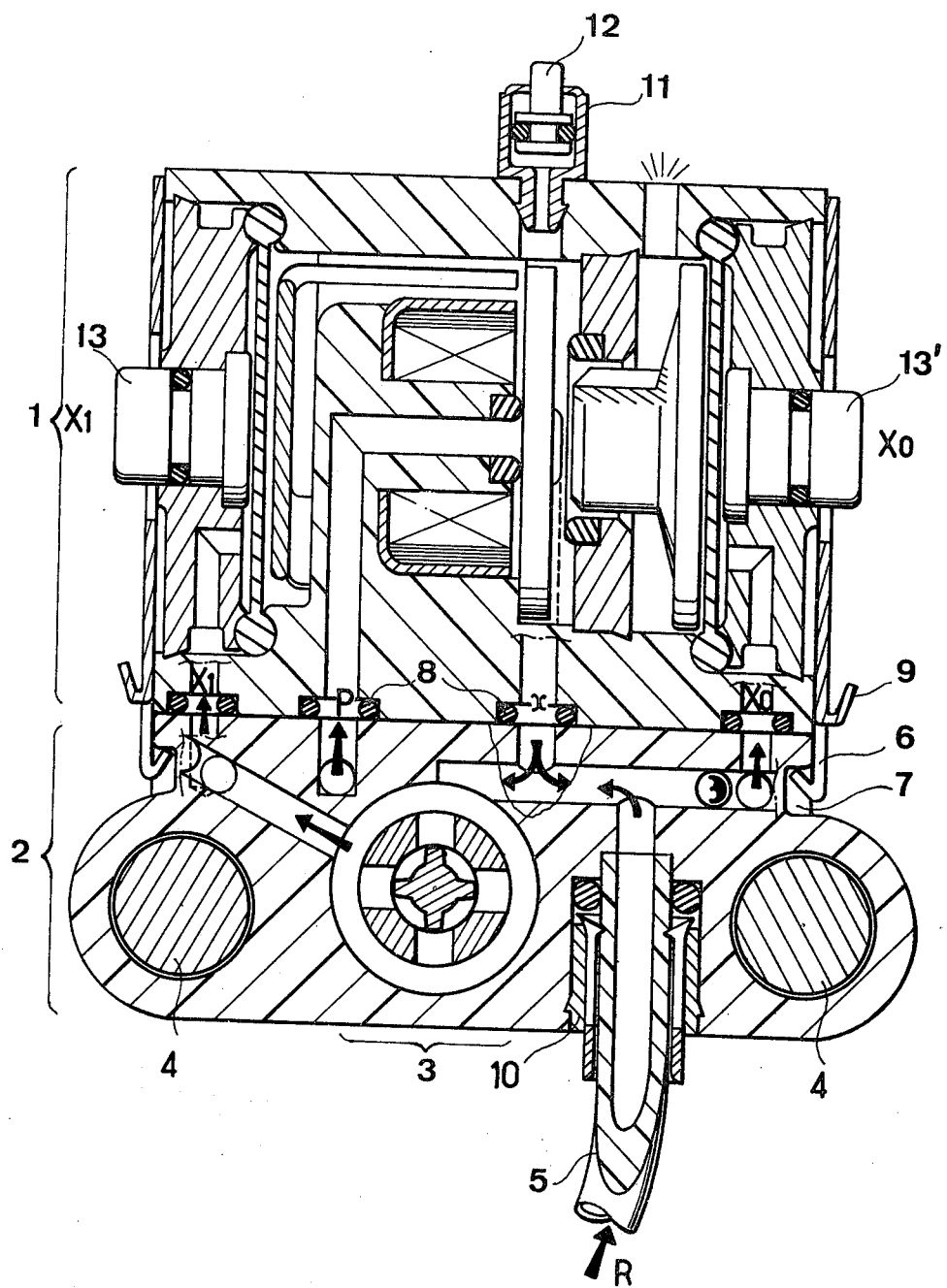
FIG. 4 is a first sectional view through the internal pneumatic mechanism of a flip-flop module according to the invention.
Figure 5:
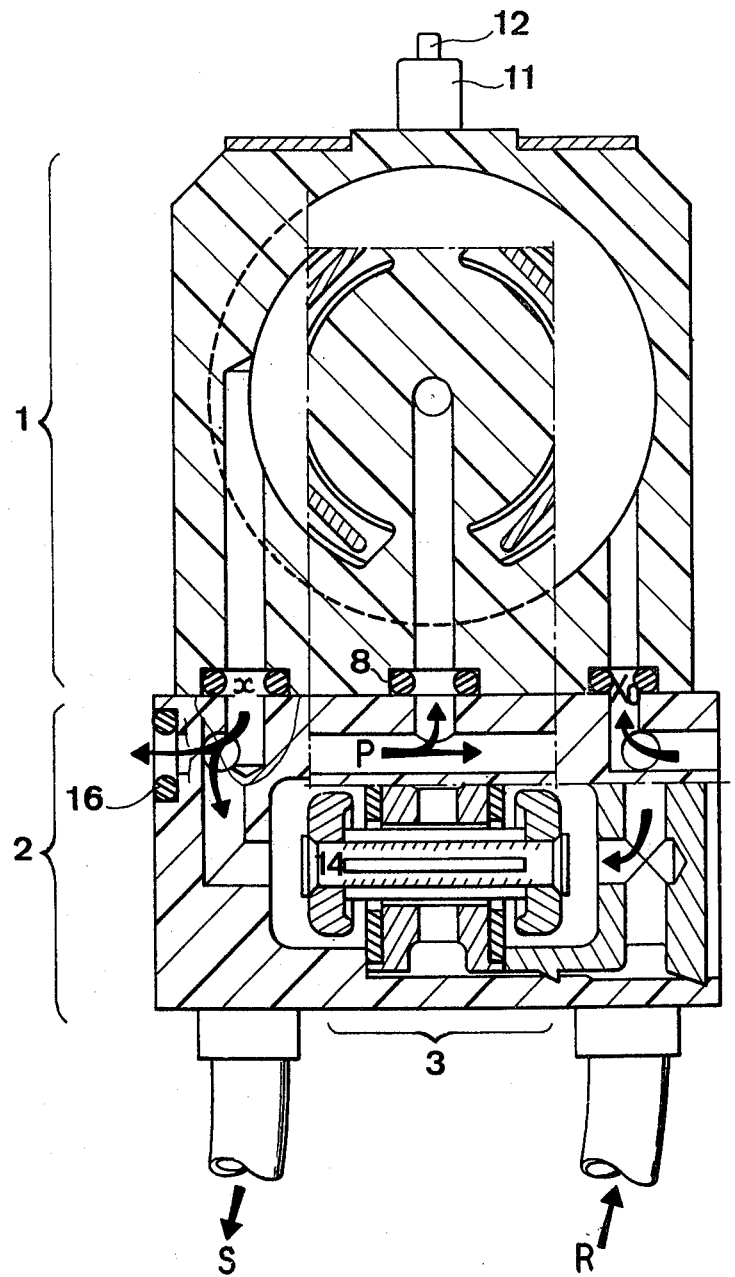
FIG. 5 is a second sectional view through the internal pneumatic mechanism of a flip-flop module according to the invention.

The actual pneumatic flip-flop mechanism contained within sub-modules 1 is depicted in more detail in FIGS. 4 and 5 of the drawing. However, the mechanism does not, per se, form part of the invention. An understanding of how the pneumatic flip-flop operates can be had by resorting to the disclosure of my two earlier-filed copending applications, identified above.

The sub-module 2 of each flip-flop module contains the pneumatic AND-gate, and is provided with a pair of conduits 5 for respectively furnishing the command signal $S_n$ and for receiving the return signal $R_n$.

A vertical cross-section through the connected sub-modules 1 and 2 is shown in FIG. 4. Reference numeral 3 identifies the pneumatic AND-gate. Reference numeral 4 identifies two parallel tie rods on which the lower sub-modules 2 are mounted, and which serve for the horizontal alignment of the flip-flop modules 1, 2. It will be seen that the trigger inlet $X_1$ of the module has a first portion contained within sub-module 1 and a second portion contained within sub-module 2. Likewise, the principal fluid conduit P, the reset inlet $X_0$ and the output $x$ of the module, each have a first portion located in the first sub-module 1 and a second portion located in the second sub-module 2.

These first and second portions of the various inlet and outlet means of the two sub-modules are so arranged, and the sub-modules are so configured that when sub-module 1 is placed against sub-module 2 all the necessary operative connections, explained before, between the various inlets and outlets are directly effected.

It will be appreciated from FIG. 3, for example, that the first portion of the command outlet $x$ of sub-module 1 is in pneumatic communication with the second portion of outlet $x$ of sub-module 2, and that this second portion is in turn connected to the second portion of reset inlet $X_0$ of the sub-module 2 of the previous module, and that furthermore the second reset inlet portion of the previous sub-module 2 is connected to the respective first inlet portion of the preceding flip-flop unit. The other connections between the modules are achieved in similar fashion—i.e., by conduits connecting the sub-modules 1 via the sub-modules 2. It is clear that in the illustrated embodiment all the interconnections between the modules are effected via the sub-modules 2. It should be understood that to effect the operative connection, the components shown in the exploded view of FIG. 3 must be placed against one another. That is, each sub-module 1 is laid on top of and in proper registry with its respective sub-module 2. Likewise the sub-modules 2 are slid along tie-rods 4 until they are in side-by-side contact. An exemplary view of the physical appearance of these modules, when operatively connected, can be seen at the top of FIG. 22, where eight flip-flop modules are shown.

The manner of attachment of the first sub-module 1 to the second sub-module 2 in the illustrated embodiment is particularly advantageous. As best seen in FIG. 4, the outer casing of sub-module 1 is provided with side walls having turned-up lower edges. These side walls are sufficiently flexible to permit outward flexing of these turned-up lower edges. The lower edges are received in grooves 7 provided in the lower sub-module 2, and the connection is a releasable snap-type connection. The side walls of the casing for submodule 1 are also provided with turned-up flanges 9, which face outwardly. These can be engaged, for example by a screwdriver, for the purpose of outwardly deflecting the side wall and causing disengagement of lower edge 6 from the respective recess 7.

In FIG. 4, O-rings 8 effect a satisfactorily tight pneumatic seal in the connections between the various first and second conduit portions.

In FIG. 4, pressure-checking means 11, 12 is provided for checking the existence of pressure in the flip-flop module, and for providing a visual indication of whether the flip-flop is in triggered or reset condition.

Furthermore, the flip-flop unit shown in FIG. 4 is provided with manually operable triggering means 13 and with manually operable resetting means 13' for overriding or altering the program at the will of an operator.

Finally, with reference to FIG. 4, it is noted that the conduit 5 for the feedback signal is connectable to the respective conduit portion of the flip-flop module in a plug-in manner. Thus, the modules can be assembled to form a binary chain, after which the feedback pneumatic conduits from the machine or apparatus being controlled can be attached to the logic system. This is a particularly convenient manner of assembly.

FIG. 5 is another section through the connected sub-modules 1 and 2 of a flip-flop module.

When the binary chain explained in FIGS. 1 and 2 and depicted in FIGS. 3–5 is employed to control a simple sequence of operations, i.e., for the control of a simple series of operations, then each operation can be associated with one of the flip-flop stages of the chain, and no auxiliary logic need be used. However, it often happens that in a sequence of operations to be automatically controlled, some of the operations occur simultaneously or are partially overlapping. When this is the case, the simple flip-flop binary chain of FIG. 1 must be augmented by auxiliary logic-gate modules.

Figure 6:
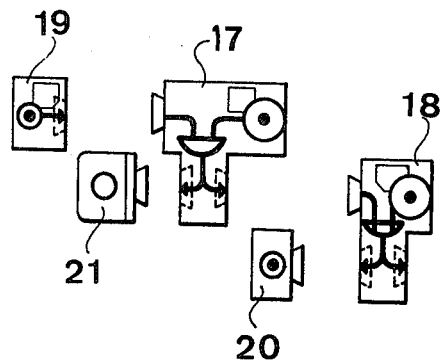
FIG. 6 is a view of several different logic-gate modules and other modules capable of being formed into more complex logic function blocks.

Several such logic-gate modules, and supporting modules, are illustrated in FIG. 6. Numeral 17 designates an AND-gate module. Numeral 18 designates an OR-gate module. Numeral 19 designates an input module, numeral 20 designates an output module, and numeral 21 designates a support module—i.e., a module serving for mounting purposes, as will be described.

Figure 7A:
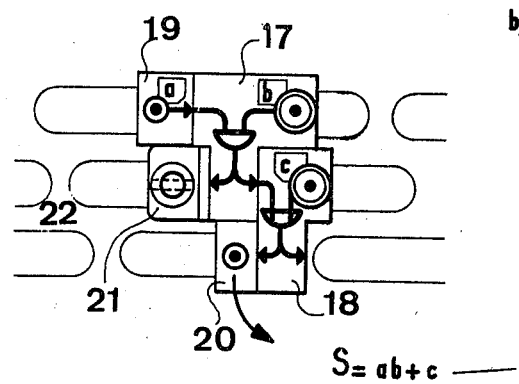
FIG. 7a is a view of some of the logic-gate modules of FIG. 6 assembled into a complex function block.
Figure 7B:
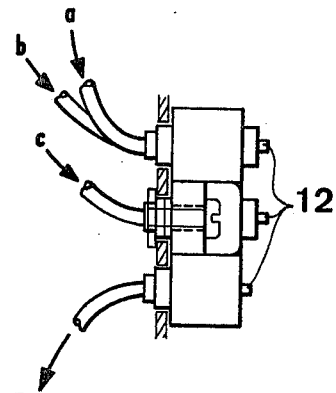

FIG. 7 shows the logic-gate and other modules of FIG. 6 assembled together to synthesize the logical function $S = ab + c$. It will be noted that the logic-gate and other modules of FIG. 6 are connected with each other in a detachable plug-in fashion, and that the assembled modules in FIG. 7 are supported on a supporting rack having elongated cut-outs by means of the holding module 21, through which a retaining bolt and nut are passed. It should be noted that each of the logic-gate and other components shown is provided on one face with a symbolic representation of its respective function. The input module 19, has an arrow indicating input. The AND-gate module 17 bears the conventional symbol for an AND-gate and has two output arrows to indicated its two outlet ports, and so forth with regard to the other modules. When these components are assembled as in FIG. 7, or to form any other complex function block, their respective symbolic representations combine to form a logic circuit of the function being implemented. For instance in FIG. 7, the symbolic representation of the logic circuit illustrated is precisely that of the function realized, namely $S = ab + c$. A side view of the complex block of FIG. 7 is found in FIG. 7a. It will be seen that the symbolic circuit representations are located on one side of the blocks, whereas the actual inputs and outputs for fluid—i.e., air or liquid—are located on the reverse or rear sides of the blocks.

Figure 8:
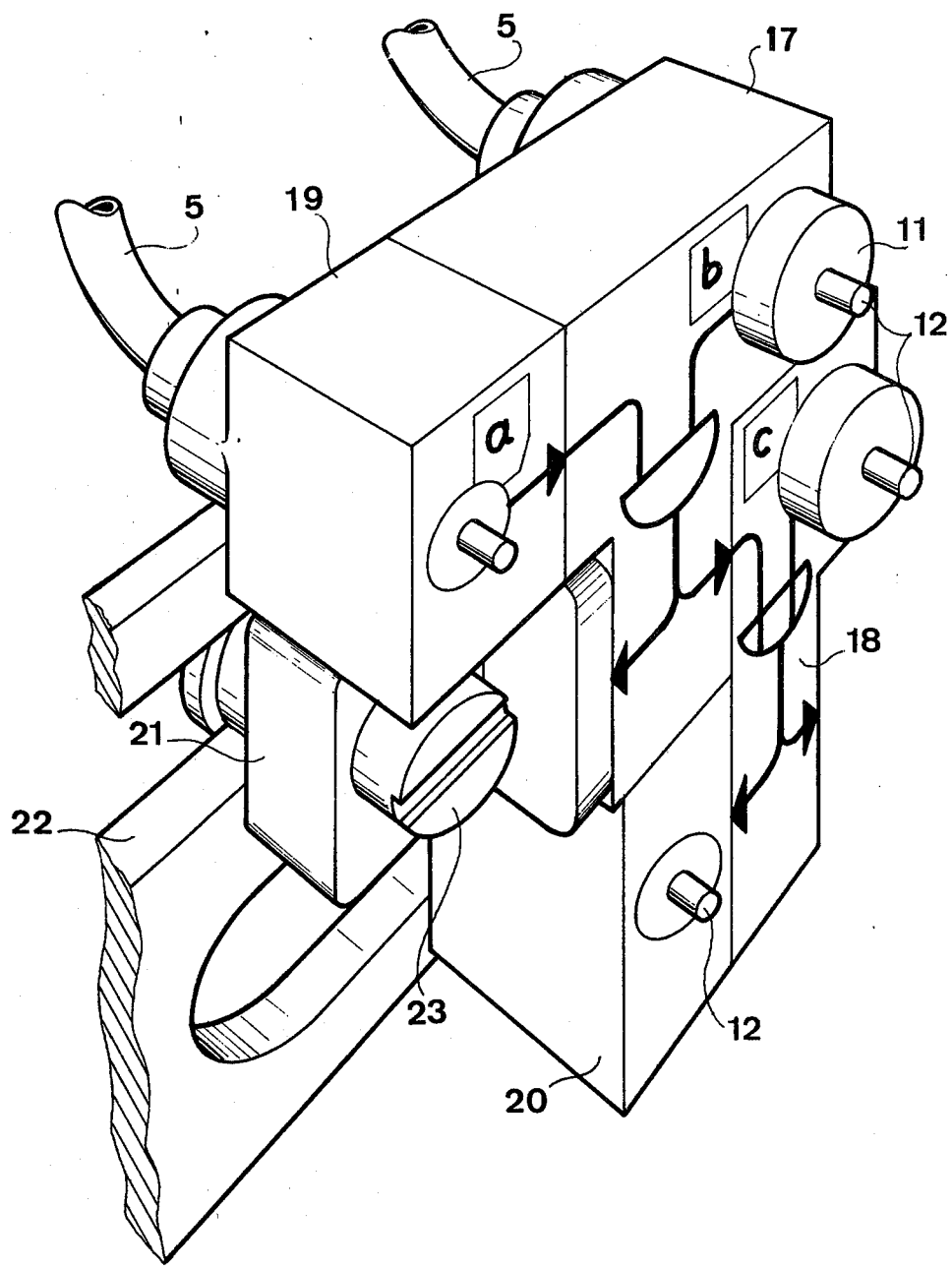
FIG. 8 is a perspective view of the function blocks of FIGS. 7a and 7b.

FIG. 8 shows a perspective view of the assembly of logic-gate and other modules just described.

FIG. 9 is a sectional view through the assembly of modules of FIGS. 7 and 8. The input module 19 has an input for a fluid input signal $a$, which is communicated to the input of AND-gate module 17. Another input signal to AND-gate module 17 is designated by arrow $b$. If only signal $a$ or only signal $b$ are present, then the double-poppet valve shown will be forced to an end position thereof, preventing the passage of the input signal. However, if both input signals *a* and *b* are present, the opposite ends of the double-poppet valve will both experience a force, and the poppet valve body will be held in centered position, allowing both signals *a* and *b* to pass to the output, and thence to the left-hand input of OR-gate module 18. The other inlet of OR-gate module 18 is furnished with an input signal *c*. As will be readily apparent, the OR-gate module is so designed that either of the input signals can pass even in the absence of the other. The output signal S of the OR-gate passes to the output module 20.

FIG. 10 is a section through the assembly just described, taken on line II—II of FIG. 9.

Figure 11:
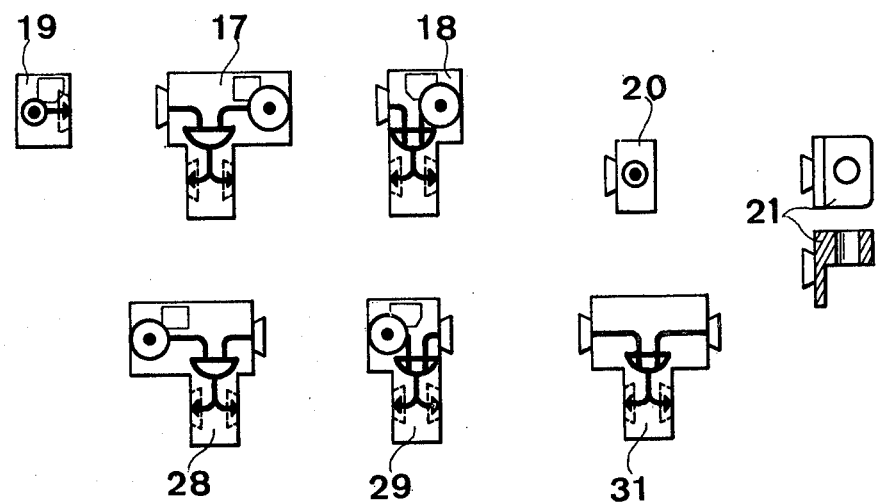
FIG. 11 shows a further set of logic-gate modules and other modules according to the invention.
Figure 12:
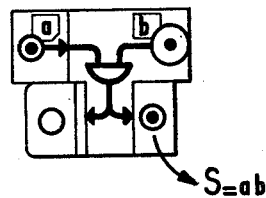
FIGS. 12-19 illustrate how the logic-gate modules and other modules shown in FIG. 11 can be combined to implement various specified logic operations.
Figure 13:
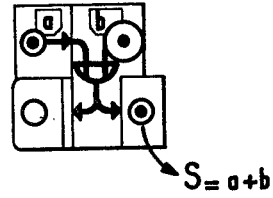
Figure 14:
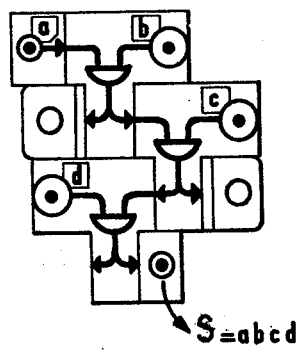
Figure 15:
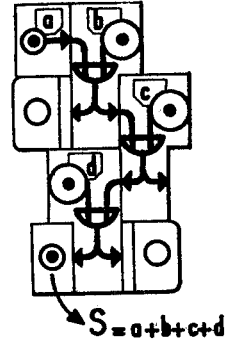
Figure 16:
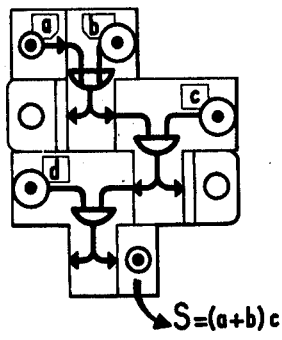
Figure 17:
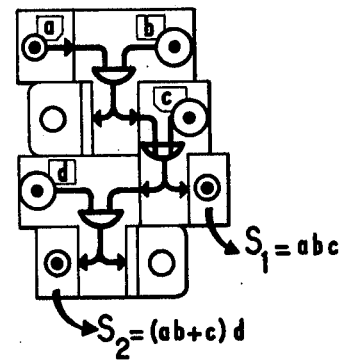
Figure 18:
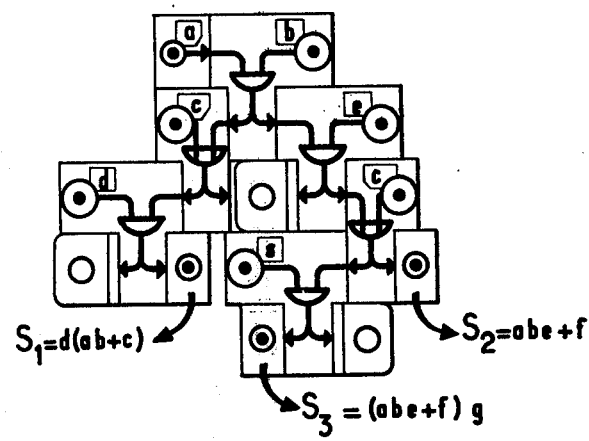
Figure 19:
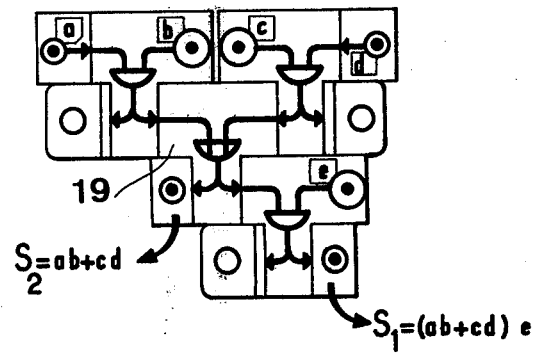

FIG. 11 depicts the different logic-gate and other modules of a set of such modules used for realizing any logic functions needed to supplement the operation of the binary chain already discussed. As before, there are provided an input module 19, an AND-gate module 17, an OR-gate module 18, and output module 20, and a holding module 21 used for mounting purposes. Three other forms of modules are provided, for the sole purpose of increasing the ease with which compact complexes can be built. These include a further AND-gate module 28, equivalent to AND-gate module 17, but the mirror-symmetrical image thereof. Also included is an OR-gate module 29 mirror symmetrical to OR-gate module 18, and a further OR-gate module 21 having two male connectors instead of just one, as is the case with OR-gate module 18. Further logic gates can of course be provided, for instance ready-made NAND-gates, NOR-gates and inverters, if desired.

FIGS. 12-19 show how the logic-gate and other modules of FIG. 11 can be combined to realize a variety of logic operations. The logic operation implemented is denoted in equation form next to each assembly of modules.

Figure 22:
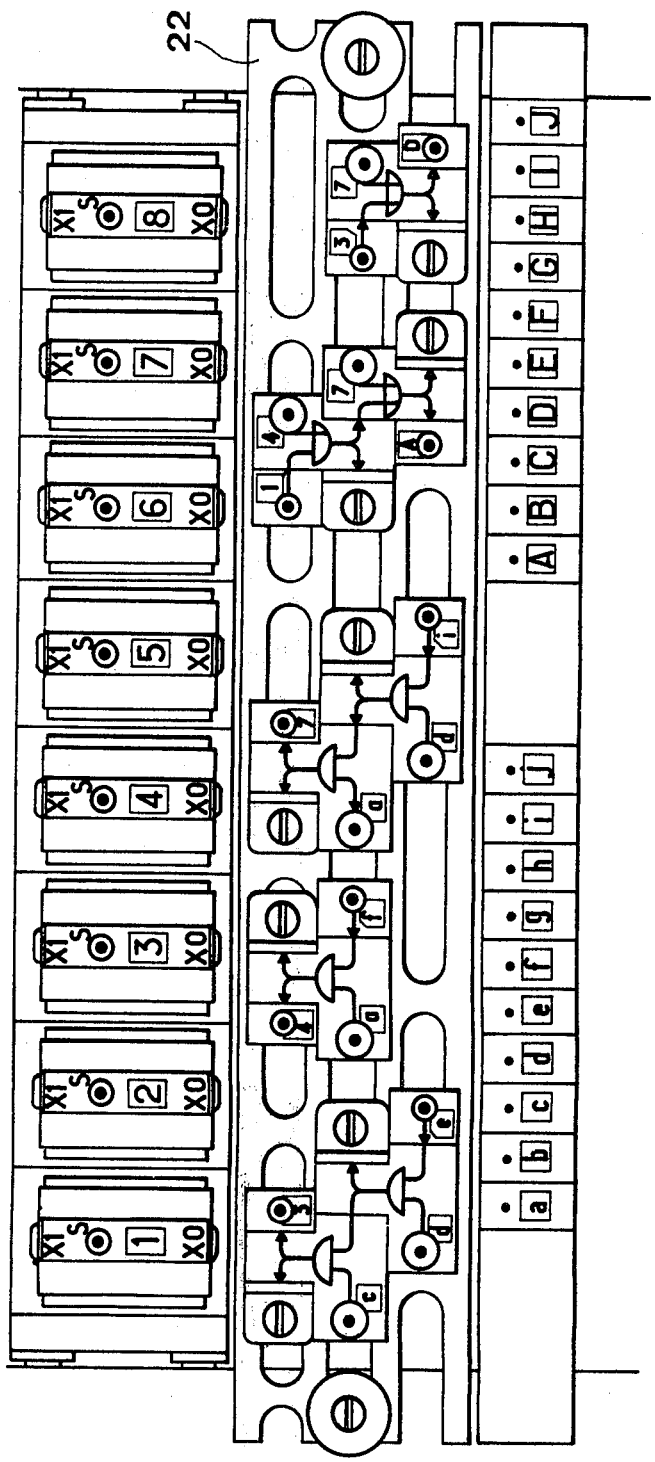
FIG. 22 is an illustration, from above, of the actual appearance of a fluid logic system according to the invention arranged to automatically control the sequence of operations set forth in FIG. 20.

FIGS. 20-22 illustrate an exemplary arrangement of the flip-flop, logic-gate and other modules disclosed.

FIG. 20 illustrates in tabular form an eight-stage sequence of operations, to be automatically controlled by pneumatic logic means. These operations could, for example, be motions of a machine tool, the addition of ingredients into a chemical reactor, or many other possible operation.

The first stage of the sequence reqires only the performance of operation A. The second stage requires the performance of operation B. The third stage, however, requires the simultaneous performance of operations C, D and E, whereas the fourth stage requires the performance of operations A and F, and so forth.

FIg. 21 is a very schematic view of an eight-stage binary chain of flip-flop modules numbered 1–8, showing the source for the supply of primary operating pressure, as well as the manual activator for generating the first fluid triggering signal.

FIG. 21a is a conventional logic diagram of the logic implied by the sequence of operations set forth in the table of FIG. 20. The blocks designated *a–j* symbolically represent the generation of feedback signals by the controlled apparatus, indicating that the respective programmed operation has been performed, whereas blocks A–J indicate the inputs of the controlled apparatus to which are to be applied command signals, to initiate the respective operation.

The first flip-flop module is triggered, for instance by manually activated means, and the module produces the first command signal S1, which initiates operation A. When operation A is completed, a feedback signal *a* is generated resulting in the generation of a triggering signal for the second flip-flop module. The second flip-flop module generates a command signal S2 which initiates operation B. When operation B is completed, a feedback signal *b* results in the triggering of the third flip-flop module. The third flip-flop module produces a command signal S3 which initiates the three operations C, D and E. When all three operations C, D, and E are completed, and only when all three are completed, a feedback signal R3 is generated, and so forth.

FIG. 22 illustrates the physical appearance of an arrangement of the disclosed modules fo realizing these operations. The conduits connecting the flip-flop modules to the supplementary logic blocks are located at the underside of the arrangement and are not visible in FIG. 22.

It will be understood that each of the elements described above, or two or more together, may also find a useful application in other types of constructions differing from the types described above.

While the invention has been illustrated and described as embodied in a set of fluid logic modules for use in constructing fluid logic systems for the automated control of a sequence of programmed operations, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be protected by Letters Patent is set forth in the appended claims:

1. A set of fluid logic modules for use in building a fluid logic system of the type employed for the automatic control of a sequence of programmed operations, the set comprising a plurality of fluid flip-flop modules connectable together to form a binary chain, each flip-flop module having trigger inlet means for receiving a fluid triggering signal upon completion of the respective preceding programmed operation, command outlet means for furnishing a fluid command signal to initiate a respective programmed operation upon receipt by said inlet means of said triggering signal, and triggering outlet means for furnishing a fluid triggering signal upon completion of the respective programmed operation, said trigger inlet means and triggering outlet means of each module being so arranged and configurated that the flip-flop modules can be placed side-by-side to form a binary chain with the triggering outlet means of each module being operatively connected with the trigger inlet means of the next module in the chain, wherein each of said triggering outlet means includes a fluid AND-gate having one inlet connected to the command outlet means of the module for receiving a fluid input signal upon generation by the module of a command signal, the AND-gate having another inlet arranged for receipt of a further fluid input signal when the programmed operation controlled by the module is completed, and the AND-gate having an outlet for furnishing said fluid triggering signal, wherein each of said flip-flop modules is resettable upon receipt by the respective trigger inlet means of a reset signal, and wherein each of said flip-flop modules has resetting outlet means for furnishing a fluid reset signal upon generation by the module of said command signal, said trigger inlet means and resetting outlet means of each module being so arranged and configured that when the flip-flop modules are connected together in series to form a binary chain the resetting outlet means of each module is operatively connected with the trigger inlet means of the preceding module in the chain, whereby when a module initiates a respective operation it will simultaneously effect resetting of the previously triggered module.

2. A set of fluid logic modules as defined in claim 1, wherein said trigger inlet means comprises a trigger inlet and a reset inlet, and wherein said trigger inlet, reset inlet, triggering outlet means and resetting outlet means of each module are so arranged and configurated that when the flip-flop modules are connected together in series to form a binary chain hte triggering outlet means of each module is operatively connected with the trigger inlet of the next module in the series, and the resetting outlet of each module is operatively connected with the reset inlet of the preceding module in the chain.

3. A set of fluid logic modules as defined in claim 2, wherein each of said modules is comprised of a first sub-module and a second sub-module, said first sub-module including a flip-flop unit which has a first portion of said trigger inlet, a first portion of said reset inlet, a first portion of said command outlet means and a first portion of said triggering outlet means, and said second sub-module including said AND-gate, a second portion of said trigger inlet, a second portion of said reset inlet, a second portion of said command outlet means, and a second portion of said triggering outlet means, said first and second sub-modules being so configured and said first and second portions being so arranged that each first sub-module can be placed against a respective second sub-module in a manner effecting operative connections of said first to said second portions, with adjoining modules in said binary chain being connected together at their respective second sub-modules; and further comprising means for effecting a releaseable coupling together of respective first and second sub-modules.

4. A set of fluid logic modules as defined in claim 2, wherein each of said flip-flop modules includes manually actuatable triggering and resetting means.

5. A set of fluid logic modules for use in building a fluid logic system of the type employed for the automatic control of a sequence of programmed operations, the set comprising a plurality of fluid flip-flop modules connectable together to form a binary chain, each flip-flop module having trigger inlet means for receiving a fluid triggering signal upon completion of the respective preceding programmed operation, command outlet means for furnishing a fluid command signal to initiate a respective programmed operation upon receipt by said trigger inlet means of said triggering signal, and triggering outlet means for furnishing a fluid triggering signal upon completion of the respective programmed operation, said trigger inlet means and triggering outlet means of each module being so arranged and configurated that the flip-flop modules can be placed side-by-side to form a binary chain with the triggering outlet means of each module being operatively connected with the trigger inlet means of the next module in the chain, wherein each of said flip-flop modules is resettable upon receipt by the respective trigger inlet means of a reset signal, and wherein each of said flip-flop modules has resetting outlet means for furnishing a fluid reset signal upon generation by the module of said command signal, said trigger inlet means and resettng outlet means of each module being so arranged and configurated that when the flip-flop modules are connected together in series to form a binary chain the resetting outlet means of each module is operatively connected with the trigger inlet means of the preceding module in the chain, whereby when a module initiates a respective operation it will simultaneously effect resetting of the previously triggered module, wherein the trigger inlet means and trigger outlet means of each module are so constructed that when a plurality of said modules are placed in side-by-side relationship to form a binary chain the modules will form pairs of adjoining modules, each such pair of modules being comprised a first module and a second module downstream of said first module, and wherein the triggering outlet means of the first module of such pair and the trigger inlet means of the second module of such pair together comprise a fluid AND-gate having one inlet connected to the first module for receiving a fluid input signal upon generation by the first module of a command signal, the AND-gate having another inlet arranged for receipt of a further fluid input signal when the programmed operation controlled by the first module is completed, and the AND-gate having an outlet connected to the second module for furnishing a fluid triggering signal thereto.

6. A set of fluid logic modules as defined in claim 5, each of said flip-flop modules requiring for its operation a primary flow of pressure fluid, and wherein each of said modules has a primary fluid inlet and a primary fluid outlet, and wherein said primary inlet and primary outlet of each module are so arranged and configurated that when the flip-flop modules are connected together in series to form a binary chain the primary fluid outlet of each module is operatively connected with the primary fluid inlet of the next module in the chain.

7. A set of fluid logic modules as defined in claim 5; and further including a plurality of fluid logic-gate modules including fluid AND-gate modules and fluid OR-gate modules connected together in detachable plug-in fashion forming fluid-logic functional blocks detachably connected to respective ones of said flip-flop modules.

8. A set of fluid logic modules as defined in claim 7, wherein said logic-gate modules are provided with symbolic representations of the logic performed by the respective module, and wherein the logic-gate modules and their respective symbolic representations are so configurated that when the logic-gate modules are connected together to form fluid-logic functional blocks the respective symbolic representations combine to form a symbolic representation of the logic circuit formed.

9. A set of fluid logic modules as defined in claim 8, wherein said plurality of logic-gate modules include mirror-symmetrical pairs of AND-gate modules and mirror-symmetrical pairs of OR-gate modules.

10. A set of fluid logic modules as defined in claim 8, wherein said logic-gate modules each have one side provided with said representation and an opposite side provided with inlets and outlets for the flow of fluid input and output signals.

11. A set of fluid logic modules as defined in claim 5, wherein each of said flip-flop modules includes means for providing a visual indication of whether the module is in triggered or reset condition.

12. A set of fluid logic modules for use in building a fluid logic system of the type employed for automatic control of a sequence of programmed operations, the set comprising a plurality of fluid flip-flop modules connectable together to form a binary chain, each flip-flop module having trigger inlet means for receiving a fluid triggering signal upon completion of the respective preceding programmed operation, command outlet means for furnishing a fluid command signal to initiate a respective programmed operation upon receipt by said inlet means of said triggering signal, and triggering outlet means for furnishing a fluid triggering signal upon completion of theh respective programmed operation, said trigger inlet means and triggering outlet means of each module being so arranged and configured that the flip-flop modules can be placed side-by-side to form a binary chain with the triggering outlet means of each module being operatively connected with the trigger inlet means of the next module in the chain, wherein each of said triggering outlet means includes a fluid AND-gate having one inlet connected to the command outlet means of the module for receiving a fluid input signal upon generation by the module of a command signal, the AND-gate having another inlet arranged for receipt of a fluid input signal when the programmed operation controlled by the module is completed, and the AND-gate having an outlet for furnishing said fluid triggering signal, each of said flip-flop modules requiring for its operation a primary flow of pressure fluid, and wherein each of said modules has a primary fluid inlet and a primary fluid outlet, and wherein said primary inlet and primary outlet of each module are so arranged and configured that when the flip-flop modules are connected together in series to form a binary chain the primary fluid outlet of each module is operatively connected with the primary fluid inlet of the next module in the chain, wherein each of said flip-flop modules is resettable upon receipt by the respective trigger inlet means of a reset signal, and wherein each of said flip-flop modules has resetting outlet means for furnishing a fluid reset signal upon generation by the module of said command signal, said trigger inlet means and resetting outlet means of each module being so arranged and configured that when the flip-flop modules are connected together in series to form a binary chain the resetting outlet means of each module is operatively connected with the trigger inlet means of the preceding module in the chain, whereby when a module initiates a respective operation it will simultaneously effect resetting of the previously triggered module.

* * * * *